US008645230B2

(12) United States Patent
Oliver et al.

(10) Patent No.: US 8,645,230 B2
(45) Date of Patent: Feb. 4, 2014

(54) VIRTUAL CLOSET FOR STORING AND ACCESSING VIRTUAL REPRESENTATIONS OF ITEMS

(75) Inventors: Thomas C. Oliver, Windsor, CO (US); Megan Lesley Tedesco, Sammamish, WA (US); John Clavin, Seattle, WA (US); Eyal Ofek, Redmond, WA (US); Doug Burger, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 13/051,677

(22) Filed: Mar. 18, 2011

(65) Prior Publication Data

US 2012/0239513 A1  Sep. 20, 2012

(51) Int. Cl.
*G06Q 30/00* (2012.01)
(52) U.S. Cl.
USPC ........ 705/27.2; 705/26.1; 705/26.8; 705/27.1
(58) Field of Classification Search
USPC .............................................. 705/26.1–27.2
See application file for complete search history.

(56) References Cited

U.S. PATENT DOCUMENTS

| 7,149,665 | B2 | 12/2006 | Feld et al. | |
| 7,712,035 | B2 | 5/2010 | Giannini | |
| 2008/0082395 | A1 | 4/2008 | Shulman et al. | |
| 2008/0162603 | A1* | 7/2008 | Garg et al. | 707/204 |
| 2008/0195973 | A1 | 8/2008 | Shimkin | |
| 2009/0100076 | A1* | 4/2009 | Hamilton, II et al. | 707/100 |
| 2010/0094729 | A1 | 4/2010 | Gray et al. | |
| 2010/0191770 | A1* | 7/2010 | Cho et al. | 707/783 |
| 2011/0078055 | A1* | 3/2011 | Faribault et al. | 705/27.2 |
| 2011/0116690 | A1* | 5/2011 | Ross et al. | 382/118 |
| 2011/0208615 | A1* | 8/2011 | Steelberg et al. | 705/27.1 |

OTHER PUBLICATIONS

LaVallee, A. (Sep. 22, 2006). Style & substance: Now, virtual fashion; second life designers make real money creating clothes for simulation game's players. Wall Street Journal.*
"Apple Wants You to Dress Up in Its Virtual Closet," 2 pages, Retrieved on: Nov. 29, 2010, Available at: http://www.mactech.com/2010/07/29/apple-wants-you-dress-its-virtual-closet.

* cited by examiner

*Primary Examiner* — Resha Desai
(74) *Attorney, Agent, or Firm* — Shook Hardy & Bacon LLP

(57) ABSTRACT

A virtual closet stores and presents virtual representations of physical items. The virtual representations may include virtual representations of items owned by a user, items the user would like to own, and memorabilia items for the user. The virtual closet may provide a number of functions. In some embodiments, the virtual closet may be used to facilitate selling items on online selling platforms by providing information (including virtual representations of the items) from the virtual closet to the online selling platforms to place the items for sale. The virtual closet may also be used in some embodiments to facilitate providing advertising targeted to the user based on information available to the virtual closet.

19 Claims, 9 Drawing Sheets

VIRTUAL CLOSET FOR STORING AND ACCESSING VIRTUAL REPRESENTATIONS OF ITEMS

BACKGROUND

In today's consumer society, people often own numerous physical items—everything from the bare necessities to splurge items. As a result, it may be difficult for people to manage all of their possessions. This difficulty may include problems keeping track of everything they own and remembering where certain items are located when they need them. Additionally, people may have trouble storing all the physical items, especially if they live in more congested areas, such as cities, with small dwellings and limited storage space.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to a virtual closet that stores and presents virtual representations of physical items. The virtual closet may include virtual representations of items owned by a user, items the user would like to own (e.g., purchase), and memorabilia items for the user. The virtual closet may be employed for a number of purposes. In some embodiments, the virtual closet may facilitate placing items for sale on online selling platforms by providing information of virtual representations from the virtual closet to online selling platforms. In further embodiments, information from a user's virtual closet may be leveraged to target advertisements to the user.

BRIEF DESCRIPTION OF THE DRAWINGS

The present invention is described in detail below with reference to the attached drawing figures, wherein.

DETAILED DESCRIPTION

Figure 1:
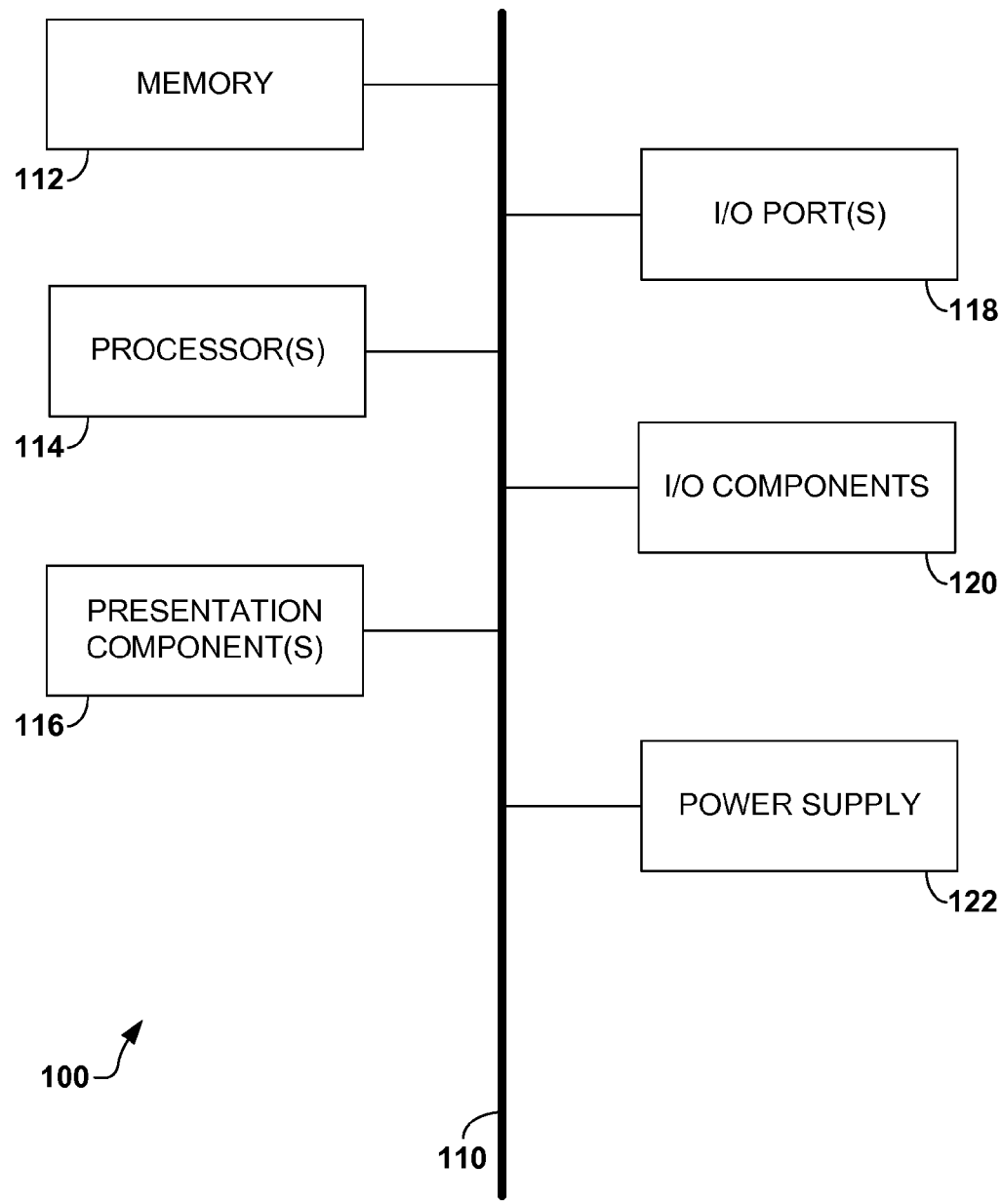
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to providing a virtual closet that contains virtual representations of physical items. Each virtual representation is a visual depiction of a corresponding physical item and may have associated information (e.g., tags and metadata) describing the item. Virtual representations for any type of item may be stored in a virtual closet and may include items a user owns, items the user would like to own (i.e., wish list items), and memorabilia items. The virtual closet may be presented to the user as a virtual environment containing the virtual representations of items with an indication of each as an owned item, wish list item, or memorabilia item.

The virtual closet may provide a number of functions. In some embodiments, the virtual closet may be used to manage items. The virtual closet may track the location of physical items in the real world and store location information with corresponding virtual representations. Additionally, the virtual closet may track usage of physical items in the real world and store usage information with corresponding virtual representations. Additionally, digital versions of documentation (e.g., user guides, manuals, instructions, etc.) for physical items may be stored with corresponding virtual representations in the virtual closet.

In various embodiments, the virtual closet may include two-dimensional or three-dimensional virtual representations, which may be added to the virtual closet using a number of different approaches. In some cases, virtual representations of items may be added to the virtual closet by using image capturing techniques to scan physical items and generate three-dimensional virtual representations of the items. As used herein, the term "scan" includes any technology for capturing images of physical items. Existing virtual representations may also be obtained from merchants or online repositories of virtual representations and added to a virtual closet, such that users don't need to scan the items. Other content (e.g., digital music, digital videos, etc.) may also be maintained by the virtual closet.

Virtual representations may also be retrieved from a virtual closet using a number of different techniques. Users may manually retrieve virtual representations by using search or browsing features provided by the virtual closet. In some instances, virtual representations may be automatically served by the virtual closet and presented to the user based on any of a number of different input signals.

The virtual closet may also facilitate selling items on online selling platforms (e.g., the EBAY website, the AMAZON website, the CRAIGSLIST website, etc.). In particular, items may be identified for selling and information, including virtual representations of the items, may be provided from the virtual closet to the online selling platform. In some embodiments, users may manually identify items to sell and upload information from the virtual closet to the online selling platform. In other embodiments, the system may automatically identify items to sell based on information available to the virtual closet.

Information from a virtual closet may also be leveraged to facilitate targeting advertisements to a user. Because the virtual closet may store information regarding any item owned by the user, any item the user may wish to purchase, and memorabilia items for the user, the virtual closet may provide a rich set of information for targeting advertisements to the user.

Accordingly, in one aspect, an embodiment of the present invention is directed to one or more computer storage media storing computer-useable instructions that, when used by one or more computing devices, causes the one or more computing devices to perform a method. The method includes storing a plurality of virtual representations of physical items in a virtual closet. The method also includes storing metadata for each of the virtual representations to indicate each virtual representation as corresponding with an owned item, a wish list item, or a memorabilia item.

In another embodiment, an aspect of the invention is directed to a computerized method, performed by one or more computing devices, for employing a virtual closet storing virtual representations of a plurality of physical items owned by a user to place a first physical item owned by the user for sale on an online selling platform. The method includes selecting a virtual representation of the first physical item in the virtual closet. The method also includes accessing information corresponding with the virtual representation of the first physical item from the virtual closet. The method further includes providing the information corresponding with the virtual representation of the first physical item from the virtual closet to the online selling platform.

A further embodiment of the present invention is directed to one or more computer storage media storing computer-useable instructions that, when used by one or more computing devices, causes the one or more computing devices to perform a method. The method includes analyzing a virtual closet to identify advertising opportunities, the virtual closet containing a plurality of virtual representations of physical items that include items owned by a user, items the user would like to own, and memorabilia items. The method also includes selecting an advertisement based on the physical items represented in the virtual closet. The method further includes providing the advertisement for presentation to the user.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Computing device 100 may operate in isolation or in conjunction with one or more other devices. For instance, some embodiments may employ cloud services to provide cloud storage and/or processing capabilities. Any and all such variations are contemplated to be within the scope of embodiments of the present invention.

As indicated previously, embodiments of the present invention are generally directed to a virtual closet that contains virtual representations of items. The virtual representations are visual depictions of physical items and may include information describing the items. The virtual representations stored in a user's virtual closet may include virtual representations of physical items that the user owns. Additionally, the virtual closet may include virtual representations of items that the user doesn't currently own but would like to purchase. As such, the virtual closet may not only store virtual representations of items owned but could also serve as a virtual wish list of items the user intends to purchase or otherwise wishes to own.

The virtual closet may also store virtual representations of memorabilia items. This would allow users to no longer keep the actual memorabilia items. In particular, a user may add a virtual representation of a memorabilia item to the virtual closet and discard the actual memorabilia item. Then, if the user wants to look at the memorabilia, the user could simply retrieve the virtual representation of the memorabilia from the virtual closet. This would reduce clutter and storage requirements in the real world. Also, it's easier for the user to access and view the virtual representation of the memorabilia item from the virtual closet than retrieving the actual item from storage if the user were to keep the item. In some embodiments, virtual representations of memorabilia items may have other content (e.g., photos, videos, audio, commentary, location/time of acquisition, etc.) attached to the virtual representations to enhance the memory of the memorabilia.

To provide an example of storing memorabilia items in a virtual closet, suppose a user has a number of trophies the user has won. The user may not wish to store all the trophies but may still like to be reminded of the accomplishments. Using embodiments of the present invention, the user could scan each of the trophies to store virtual representations of the trophies in the virtual closet and then discard the physical trophies. The user could then view the virtual representations of the trophies in the virtual closet to be reminded of the accomplishments while not having to store all the physical trophies.

As another example of storing memorabilia items in a virtual closet, suppose a user is vacationing at a beach. The user could use a mobile device to scan seashells and other items while on the vacation to add virtual representations of those items to the user's virtual closet. As such, the user wouldn't need to try to bring home those items.

Generally, virtual representations of any type of item may be included in the virtual closet. For instance, this may include clothing, accessory items, furniture, toys, tools, and electronic devices, to provide a few examples. Additionally, the virtual closet may commingle virtual representations of physical items with digital items (e.g., digital music, digital videos, etc.).

The virtual representations of physical items in the virtual closet may include two-dimensional and/or three-dimensional visual depictions of physical items. In the case of three-dimensional representations, the virtual representations of items in the virtual closet may be displayed using three-dimensional graphics on either two-dimensional or three-dimensional display devices. This may allow, for instance, the virtual representations to be rotated to provide different viewing perspectives.

The virtual closet may also be presented to a user as a virtual environment containing the virtual representations of items. In some embodiments, this may include a two-dimensional environment containing two-dimensional representations of items. In other embodiments, this may include presenting the virtual closet as a three-dimensional virtual environment containing three-dimensional representations of items. The three-dimensional environment could be a three-dimensional virtual representation of the real world and may reflect where items are actually located in the real world. For instance, the virtual closet may be a virtual representation of the user's house and indicate where items are actually located in the user's house. Alternatively, the virtual closet could be a virtual world that is not created based on the real world. For instance, the virtual closet could be a three-dimensional representation of an extremely large closet with shelves storing all the user's items.

Figure 2:
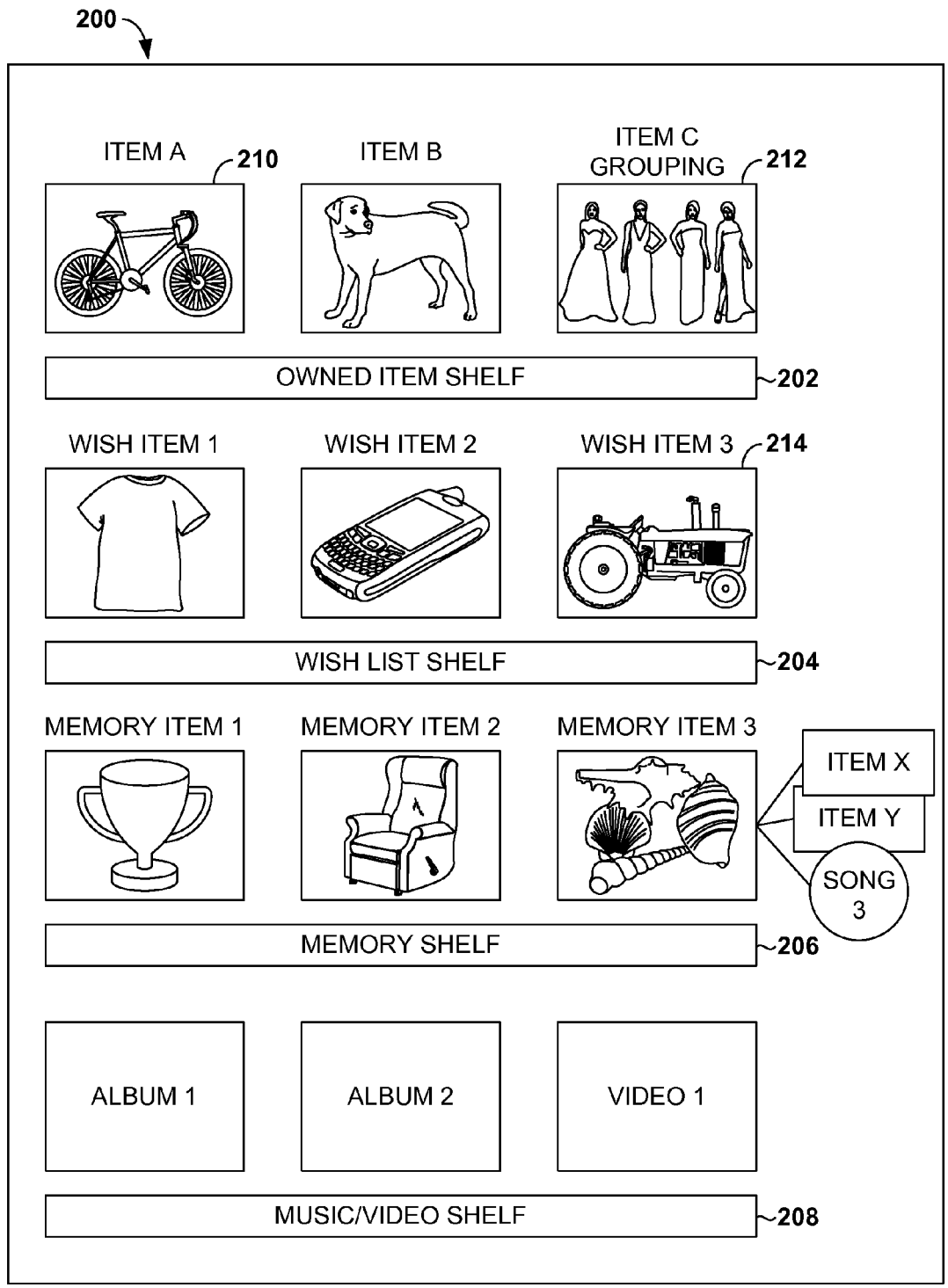
FIG. 2 is a screenshot providing an example view of a virtual closet in accordance with an embodiment of the present invention.

An example of a virtual closet 200 is provided in the screen display shown in FIG. 2. It should be understood and appreciated by those of ordinary skill in the art that the screen display of FIG. 2 is provided by way of example only and is not intended to limit the scope of the present invention in any way. The virtual closet 200 shown in FIG. 2 includes four shelves 202, 204, 206, and 208. The owned item shelf 202 includes items that are owned by the user. The wish list shelf 204 includes items that the user does not currently own but may wish to purchase or otherwise own. The memory shelf 206 includes memorabilia items. These may include items that the user previously owned but discarded after adding virtual representations of the items to the virtual closet 200. The virtual closet 200 also includes a music/video shelf 208 that includes the user's digital music and video content.

Virtual representations of items may be displayed in the virtual closet 200 individually or may be grouped together. For instance, a bike has been shown as a single item 210, while a number of dresses have been shown as an item grouping 212. The user may select the item grouping 212 to view the dresses individually. In other words, the virtual closet 200 may include a hierarchical structure that allows a user to browse different categories or groupings of items.

As will be discussed in further detail below, in addition to providing virtual representations (i.e., visual depictions) of physical items, the virtual closet 200 may also store information regarding the physical items with the virtual representations. Accordingly, a user may select a virtual representation from the virtual closet 200 to view additional information about the item corresponding with the virtual representation.

Additionally, virtual representations and other digital content may be associated with one another within the virtual closet. For instance, wish item 3 214 is shown in FIG. 2 as being associated with item X, item Y, and song 3. These may allow virtual representations to be retrieved together and/or provide additional context information for virtual representations of items.

The virtual closet may provide a number of experiences to users. One use of the virtual closet may be managing items. This may include a form of inventory tracking for the items owned by the user. In some embodiments, the virtual closet may track the location of items in the real world. As such, the virtual closet may include information regarding not only what the user owns but also where the items are stored in the real world. In particular, the virtual closet may store location information with a virtual representation of an item to indicate where the item is located in the real world. The user may manually indicate to the virtual closet where items are located, and/or the virtual closet may track the location of items using location tracking techniques, such as RFID or GPS. A user looking for an item in the real world may retrieve the item's virtual representation and associated information from the virtual closet, determine from that information where the item is located, and then retrieve the item using that information. In some instances, a user may lend an item to another person, and the virtual closet may track information with the virtual representation of the item to indicate that the item has been lent to that other person.

The virtual closet may also be configured to track usage information for items owned by user. This may include tracking information such as how often an item is used or how much of a consumable item has been consumed. Usage tracking information may be used for a number of purposes in various embodiments of the present invention. For instance, usage information may be used to provide an indication to the user when the user may need to purchase more of a consumable item (e.g., when the user is running low on the item or the expiration date for the item is approaching or has past). As another example, usage information may be used to identify items the user may like to sell. In particular, if the user doesn't use an item frequently or hasn't used the item for a period of time, the user may not have a need for that item and may wish to sell it. By tracking usage information, the virtual closet could either provide the usage information to the user to allow the user to manually identify items to sell or the virtual closet may automatically recommend items to sell based on usage information.

Usage information may also be employed to warehouse physical items. In particular, if the user doesn't employ items frequently but doesn't want to sell those items, the items could be identified using the virtual closet and stored at a certain location (e.g., a storage facility). Additionally, location tracking from the virtual closet could then be used to locate and retrieve the items when needed.

In further embodiments, usage information may be used to identify advertising opportunities. For instance, if the user employs a particular item frequently, this information may indicate that the user is particularly interested in that item and may be likely to purchase other products or services associated with that item. Additionally, the user may sign up to receive advertising based on an item for which a virtual representation is stored in the user's virtual closet (e.g., dolls, cars, trading cards, etc.).

The virtual closet may also be used to store documentation about items owned by the user. For instance, documentation such as user guides, manuals, warranty information, instructions, and the like may be stored with virtual representations of items in the virtual closet. Traditionally, people store paper copies of such information in various locations or simply discard the information, making it hard or impossible to find the information when needed. The virtual closet may provide a convenient way for people to store and access the information. In particular, a user could store a digital representation of information for an item with the virtual representation of the item in the virtual closet. Then, when the user wishes to access the information, the user may retrieve the virtual representation and associated information from the virtual closet. This could also be a cost savings for suppliers—they would not have to print the documentation but could instead place them in users' virtual closet, email a link to the documentation, or otherwise provide a digital version of the documentation to allow users to store the documentation in the users' virtual closets.

In some embodiments, the virtual closet could also assist users in visualizing whether different items would be coordinated by viewing virtual representations of items together in the virtual closet. For instance, this would help users coordinate items they already own (e.g., matching clothes). It could also be used to coordinate items users own with items they are considering purchasing (e.g., does the shirt the user is considering buying go with pants the user already owns). Providing three-dimensional virtual representations of items in some embodiments would further enhance this experience.

Virtual representations of items may be added to a user's virtual closet using any of a number of different approaches. As noted above, although the virtual closet may include two-dimensional virtual representations, some embodiments are directed to employing three-dimensional virtual representations of physical items to provide a more realistic virtual closet. In some embodiments, virtual representations of items may be manually generated by a user and added to the user's virtual closet. This may include the user employing a depth camera or other device to scan a physical item and generate a three-dimensional representation of that item. In some instances, an in-home device could be used to scan items and generate virtual representations of the items. For example, a depth sensor such as the KINECT sensor could be employed by a user to scan items and generate three-dimensional representations of the items. In other instances, a user may manually capture virtual representations of physical items in a mobile setting. In particular, the user may employ a mobile device (e.g., a smartphone) that is configured to scan a physical item and either generate a virtual representation of the item itself or provide scanned data to another device that generates the virtual representation. Other approaches for generating three-dimensional representations of physical items may also be employed within the scope of embodiments of the present invention to allow the user to manually capture virtual representations of physical items. By way of example, a user could capture images of a physical item and employ the PHOTOSYNTH application to generate a three-dimensional representation of the item based on those images. Any and all such variations are contemplated to be within the scope of embodiments of the present invention.

Figure 3:
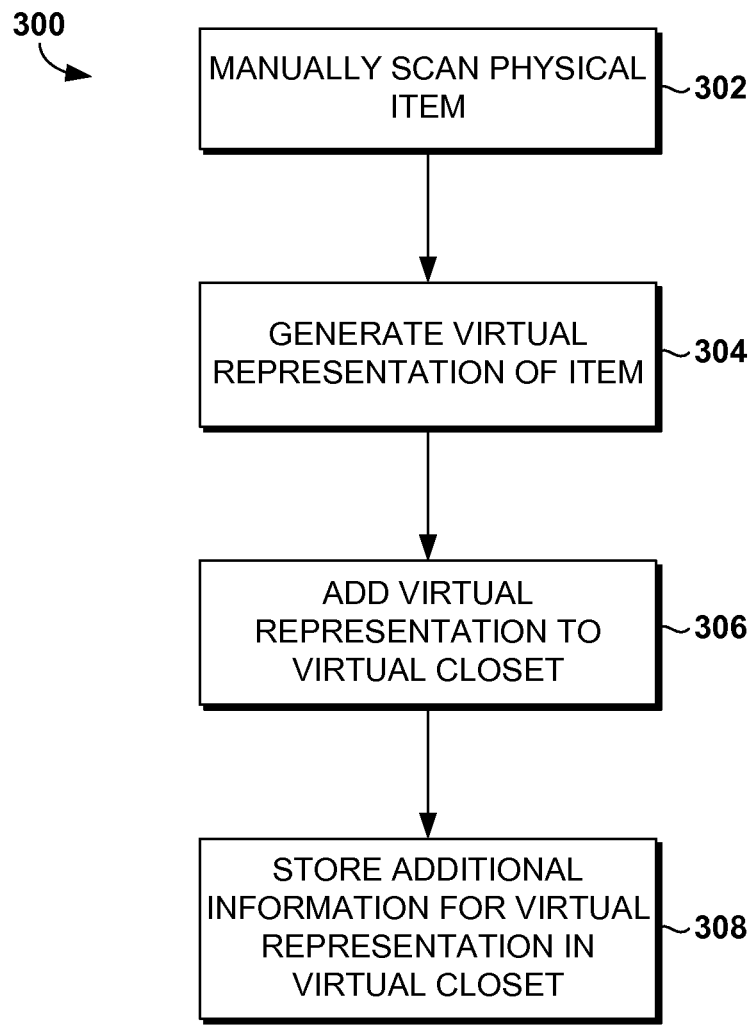
FIG. 3 is a flow diagram showing a method for manually generating a virtual representation of a physical item and storing the virtual representation in a virtual closet in accordance with an embodiment of the present invention.

Referring to FIG. 3, a flow diagram is provided that illustrates a method 300 for manually generating a virtual representation of a physical item and storing the virtual representation in a virtual closet in accordance with an embodiment of the present invention. Initially, as shown at block 302, a user manually scans a physical item. Any physical item could be scanned at block 302, including an item owned by the user or an item a user may wish to own (e.g., an item the user sees in a store or an item owned by a friend). Additionally, any of a variety of known image capturing techniques, such as a depth camera, may be employed to scan the item in order to generate a three-dimensional virtual representation of the object. Accordingly, a virtual representation of the item is generated, as shown at block 304.

The virtual representation of the item is stored as a part of the virtual closet, as shown at block 306. In some embodiments, information (e.g., tags and other metadata) may be stored in the virtual closet in association with the virtual representation, as shown at block 308. The information may, for instance, facilitate organizing the virtual closet, including browsing and searching virtual representation of items in the virtual closet, as well as provide additional information regarding the physical items represented by the virtual representations. Any of a variety of different information may be stored with virtual representations of items in a user's virtual closet. For instance, information regarding where a physical item was obtained may be stored. Also, information regarding a physical item's location may be stored with the virtual representation of the item. Additionally, usage information regarding use of the physical item may be stored with its virtual representation in the virtual closet.

The metadata stored by the virtual closet for virtual representations may also allow items to be identified as part of a set or otherwise identifying an association between items. For instance, a user's skis, poles, boots, and goggles could be part of a "skiing" set. As such, when the user searches the virtual closet for skiing gear, the virtual closet may provide information for each of the items in the set, including location information for the items in the real-world, allowing the user to find and retrieve the items. As another example, a user may indicate that he intends to wear a particular suit. Based on metadata associated with the suit (which may, for instance past usage pattern information or user-edited tags), the virtual closet may recommend particular shoes or shirt to wear with the suit. As still another example, virtual representations of items the user would want for a vacation could be manually or automatically tagged as such. Then, when the user is packing for the trip, the user could get suggestions and reminders of items to bring on the vacation based on the metadata.

As a further example of information that may be stored in a virtual closet, digital versions of documentation for physical items (e.g., user guides, manuals, warranty information, instructions, etc.) may be stored with virtual representations. In embodiments in which the virtual closet stores items owned the user, items that the user doesn't own but wishes to purchase, and/or memorabilia items, metadata may be stored with each virtual representation at block 308 to indicate the type of item as being an owned item, an item not owned (i.e., a wish list item), or a memorabilia item.

The tags, metadata, and other information stored with virtual representations of items may include user-generated information that is manually added by the user. For instance, the user may wish to tag virtual representations of items with keywords that allow the user to more quickly retrieve the virtual representations from the virtual closet. The information may also include system-generated information that is automatically added by the system. For instance, the system could store information with virtual representation of items such as the time/date the virtual representations were added to the virtual closet, location information (e.g., GPS information) regarding where a virtual representation was captured, time/date regarding when a virtual representation was captured, or calendar correlation information to determine if user was on vacation or the occurrence of some event (e.g., birthday). As another example, the system may have the capability to perform object recognition to automatically identify the item (i.e., what that item is) and add metadata to identify the virtual representation of the item as such.

In addition to including a visual depiction, a virtual representation in a virtual closet may also have captured audio stored as part of the virtual representation. For instance, if the physical item has a corresponding sound (e.g., the sound made by a musical instrument, a baby doll or other toy, a puppy, etc.), the sound of the physical item may be captured in addition to capturing the physical item's visual appearance. Both the visual depiction and captured sound may then be stored as the virtual representation of the physical item.

Figure 4:
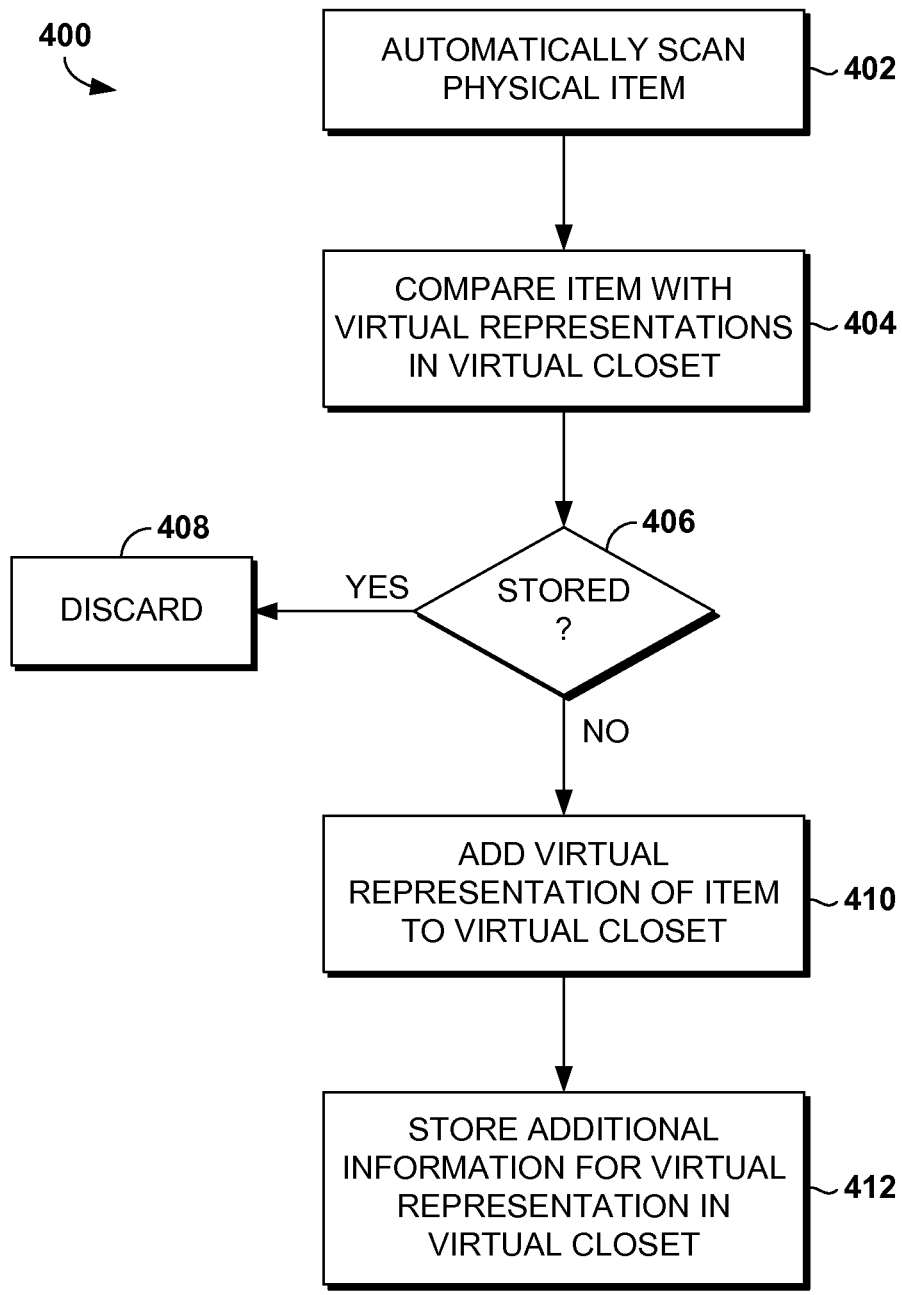
FIG. 4 is a flow diagram showing a method for automatically scanning items and adding virtual representations to a virtual closet in accordance with an embodiment of the present invention.

In some embodiments, physical items may be automatically scanned and added to a user's virtual closet. For instance, a depth camera or other image capturing device may be located in a user's home that automatically scans items brought into the user's home. The system may then determine whether a virtual representation of the item is already stored in the virtual closet and if not, store a virtual representation of the item in the virtual closet. This approach is illustrated by the flow diagram of FIG. 4 that shows a method 400 for automatically scanning items and adding virtual representations to a virtual closet.

As shown at block 402, a physical item is automatically scanned. For instance, as noted above, a depth camera or other device could be located somewhere (e.g., the user's family room) and may be configured to automatically scan for physical items brought into that location. When an item is scanned, the system compares the scanned item with virtual representations of items within the user's virtual closet to determine whether a virtual representation of the item is currently stored by the virtual closet, as shown at block 404. A determination is made at block 406 regarding whether the virtual closet currently stores a virtual representation corresponding with the scanned item. If so, the system discards data for the scanned item, as shown at block 408. In other embodiments, the system may prompt the user regarding whether to add a virtual representation for the scanned item if a virtual representation is already stored in the virtual closet. For instance, the user may own more than one of a particular item. As such, the user may view the prompt and instruct the system to add a virtual representation for the item (or just simply add metadata for the current virtual representation indicating the user owns more than one of the item), or the user may instruct the system to discard the data.

If the virtual closet does not currently include a virtual representation corresponding with the scanned item, a virtual representation of the item may be added to the virtual closet, as shown at block 410. Additional information may also be stored in the virtual closet in association with the virtual representation, as shown at block 412. As discussed above with reference to block 308 of FIG. 3, the additional information may be manually added by a user and/or automatically added by the system.

In some embodiments, the virtual representation that is added to the virtual closet at block 410 may be generated when the physical item is initially scanned at block 402. For instance, the virtual representation of the scanned item may be used when comparing against virtual representations already stored by the virtual closet. In other embodiments, the virtual representation of the scanned item may be generated after it is determined to store a virtual representation of that item. For instance, a virtual representation of the scanned item may not be required to determine whether the virtual closet already contains a virtual representation of that item. As such, the system may delay creating a virtual representation of the scanned item until it determines it is needed for adding to the virtual closet. This may, for instance, reduce or eliminate unnecessary processing requirements for the system.

In some embodiments, the virtual representation of the item may automatically be added to the virtual closet without any user input. In some cases, the virtual closet may then notify the user that the virtual representation has automatically been added to the virtual closet. This may provide the user with the opportunity to remove the virtual representation of the item if the user does not wish for it to be included in the virtual closet. In other embodiments, however, the virtual closet may prompt a user regarding whether to add the virtual representation to the virtual closet before it is actually added. For instance, the virtual closet may include a queue that displays virtual representations of items that may be added to the virtual closet. This would provide the user with the opportunity to decide whether a virtual representation of an automatically identified item should be added to the virtual closet. The user could select each virtual representation in the queue and instruct the system to either add the virtual representation to the virtual closet or to remove the virtual representation from the queue.

A variety of other approaches may also be used for adding virtual representations of items to a user's virtual closet. For instance, in some embodiments, a user may download a virtual representation of an item from a merchant. This may include downloading virtual representations of items that the user wishes to purchase. For instance, the user may visit a website offering a particular item for sale. The website may provide the opportunity for the user to download a virtual representation of the item to include in the user's virtual closet.

In some embodiments, a user may access a virtual representation of an item from a merchant in response to purchasing the item. This would provide a convenient way for virtual representations of items purchased by the user to be added to the virtual closet without requiring the purchased items to be scanned to generate virtual representations. For instance, a merchant could email or otherwise electronically provide the virtual representation to the user to allow the user to add the virtual representation of the purchased item to the user's virtual closet. The merchant may also have the ability to more directly add the virtual representation of a purchased item to a user's virtual closet. For instance, the merchant could add the virtual representation of a purchased item to a queue (such as that discussed above) that displays virtual representations that may be added to the virtual closet. The user could then simply select to add the virtual representation from the queue to the virtual closet.

Another approach to allowing users to add virtual representations of items to their virtual closets without requiring the users to scan physical items would be to provide a repository of virtual representations. Users could access the repository to browse and/or search for virtual representations of items that the users would like to add to their virtual closets. The users could then download desired virtual representations to add them to their virtual closets. Such repositories of virtual representations could be provided by merchants and/or third-party providers. In some embodiments, users may be required to pay a fee to download virtual representations from the repository.

Still another approach to adding virtual representations of items to a virtual closet would be via use of bar codes. In particular, a user may scan a bar code on an item (e.g., using a mobile device), and the virtual representation of the item may be added directly to the user's virtual closet or otherwise provided to the user to allow the user to add the virtual representation to the user's virtual closet.

With each of the approaches described above for obtaining virtual representations of physical items, the obtained virtual representations may include not only the visual depiction of the item but also other metadata. The metadata for a virtual representation of an item may including, for instance, fixed information describing the item (e.g., jeans of a particular brand, color of the jeans, size of the jeans, etc.) and variable information (e.g., date added to collection, condition, location, etc.). In addition to metadata downloaded with the virtual representation, a user could add additional metadata to the virtual representation for storage by the virtual closet.

After having been added to the virtual closet, virtual representations of items (and any associated information) may be retrieved from the virtual closet in a number of different ways in accordance with various embodiments of the present invention. In some instances, a user may manually retrieve virtual representations of items from the virtual closet. For instance, the virtual closet may include browse and/or search features to allow the user to easily locate and retrieve virtual representations of items. The user could browse/search the virtual closet using any type of input, such as input devices (e.g., keyboard, mouse, touch screen etc.), gesture control (e.g., using a depth camera), and voice commands. In some embodiments, the user may search the virtual closet for similar items. For instance, the user may specify a particular virtual representation of an item or scan a physical item and cause the virtual closet to search for virtual representations of similar items (e.g., items that are similarly shaped/colored). This provides a convenient way for users to quickly retrieve similar items.

The virtual closet may also be configured to automatically retrieve and display virtual representations of items. In particular, the virtual closet may take in a number of different signals and based on those signals, automatically serve up virtual representations of items from the virtual closet for different purposes (e.g., entertainment, recreation, commerce, socialization, etc.). In other words, real-world actions may prompt automatic retrieval and presentation of virtual representations of items from the virtual closet.

One input signal that may result in retrieval of a virtual representation of an item from a virtual closet is a user manually retrieving other virtual representations from the virtual closet. For instance, a user may manually retrieve a virtual representation of a flashlight, and the virtual closet may automatically retrieve and display a virtual representation of batteries for the flashlight, as well as the location of the batteries.

The presentation of virtual representations from the virtual closet may also be triggered based on events, such as birthdays, holidays, and anniversaries. For instance, the system may have access to a user's calendar or otherwise store event information. When an event is identified on a particular day/time, the identification of the event may trigger the presentation of particular virtual representations of items from the user's virtual closet. The particular virtual representations may have some association with the event. This may serve to provide a reminder of the event or provide the user with memories of the event.

When items are scanned to add new virtual representations of the scanned items, virtual representations of other items may be retrieved from the virtual closet and displayed. As an example to illustrate, a user may scan a seashell from a vacation. The virtual closet may recognize virtual representations of other items from that vacation and may retrieve and display those virtual representations to the user. Other types of content consumed on a computing device may also result in virtual representations being retrieved from a virtual closet. For instance, songs being played or pictures being displayed may result in virtual representations of items being retrieved from the virtual closet.

A user's online shopping actions may also serve as signals for retrieving virtual representations of items from the virtual closet. In such embodiments, the system may track the user's online activity and recognize when a user is viewing a product for sale. For instance, the system may recognize a webpage as being part of a shopping website based on the URL of the webpage and/or the system may analyze the content of a webpage (e.g., product descriptions, pricing information, etc.) to identify the webpage as offering a product for sale. Additionally, the system may identify the product for sale being viewed by the user. Based on this identification, the virtual closet may retrieve virtual representations of items to display to the user. For instance, if a user is looking at a particular item at an online store, the virtual closet may recognize that the user already owns that item and as a result, provide an indication to the user that the user already owns the item and/or the virtual closet may display the virtual representation of the item to indicate that the user already owns the item. In other instances, the virtual closet may retrieve virtual representations of items to display that are coordinated with an item the user is viewing on an online store.

In further embodiments, physiological inputs from the user may serve as signals for the retrieval of virtual representations of items from the virtual closet. In such embodiments, the system may receive physiological inputs from the user (e.g., heart rate, blood pressure, breathing rate, etc.). Based on the received physiological inputs, the system may select a virtual representation of an item and present that virtual representation to the user. For instance, the virtual closet may detect that the user is depressed based on physiological inputs and retrieve virtual representations of items that may improve the user's mood.

Figure 5:
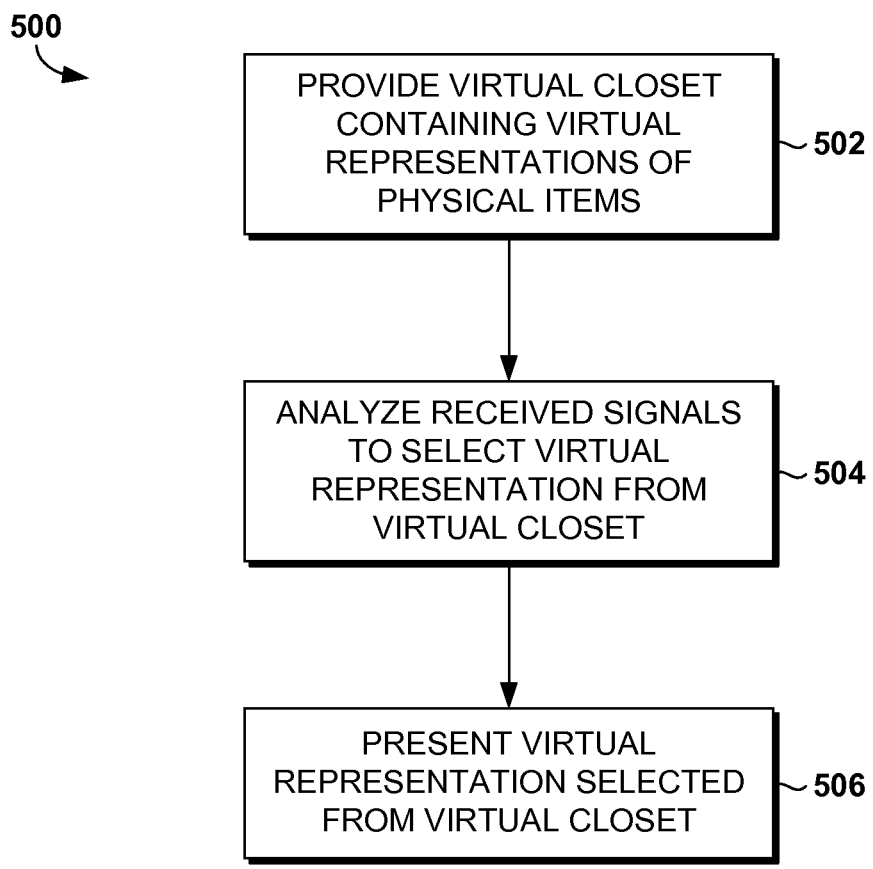
FIG. 5 is a flow diagram showing a method for automatically serving virtual representations of items from a virtual closet based on input signals in accordance with an embodiment of the present invention.

With reference to FIG. 5, a flow diagram is provided that illustrates a method for automatically serving virtual representations of items from a virtual closet based on input signals in accordance with an embodiments of the present invention. Initially, as shown at block 502, a virtual closet containing virtual representations of physical items is provided. At block 504, various received signals are analyzed to automatically identify a virtual representation from the virtual closet to present to the user. As discussed above, a variety of different signals may be received and analyzed to select a virtual representation from the virtual closet. For instance, the signals may include a virtual representation of an item manually retrieved by a user, the addition of a new virtual representation of an item to the virtual closet, consumption of other types of digital content (e.g., music, videos, etc.), a user's online shopping activities, and physiological inputs, to name a few. The selected virtual representation is presented to the user, as shown at block 506.

In further embodiments of the present invention, the virtual closet may also be used to facilitate selling users' items. In particular, virtual representations of items could be uploaded from a user's virtual closet to an online platform directed to selling items (e.g., an auction website, shopping website, classified advertisements websites), such as the EBAY, AMAZON, or CRAIGSLIST websites, to provide a few examples. Allowing virtual representations of items from a virtual closet to be directly added to an online selling platform may provide a convenient way for users to sell items. Additionally, in embodiments in which the virtual representation is a three-dimensional model created by scanning the item, the virtual representation may provide an actual depiction of the item for potential buyers to view.

Figure 6:
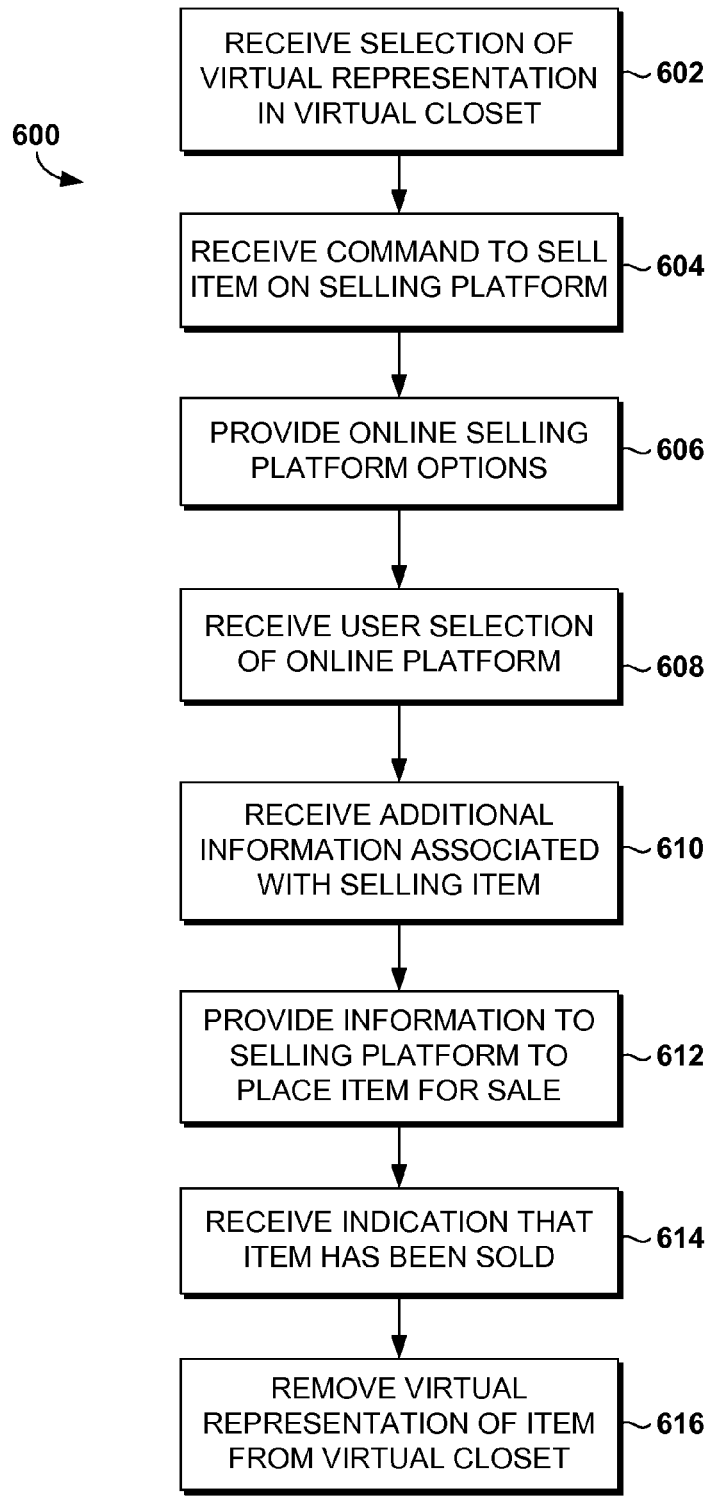
FIG. 6 is a flow diagram showing a method for using a virtual closet to place items for sale on an online selling platform in accordance with an embodiment of the present invention.

In some embodiments, a user may manually identify items the user wishes to sell and upload virtual representations of those items from the virtual closet to an online selling platform to place the items for sale on the online selling platform. Referring to FIG. 6, a flow diagram is provided that illustrates a method 600 for using a virtual closet to place items for sale on an online selling platform in accordance with an embodiment of the present invention. As shown at block 602, a user selection of a virtual representation of an item in the user's virtual closet is received. Additionally, a user command is received to sell the item corresponding with the selected virtual representation, as shown at block 604.

In some embodiments, a number of different online platforms may be available for selling the selected item. For instance, the user could select to place the item for sale on the EBAY website and/or place an advertisement for the item on the CRAIGSLIST website. Accordingly, available online selling platform options are presented to the user at block 606. The user may review the various options and select one or more of the online selling platforms. As such, a user selection of an online selling platform is received at block 608.

Additional information associated with placing the item for sale is accessed, as shown at block 610. This may include information such as a sales price and comments describing the item. The various online selling platforms may have different information requirements and options for placing items for sale. As such, the information accessed at block 610 may be dependent on the online selling platform selected by the user. The information may include information already associated with the virtual representation and stored by the virtual closet and/or may include information provided after selecting the virtual representation to place the corresponding item for sale. Additionally, the information may be manually specified by the user or the system may automatically determine the information. As an example of manually-provided information, the user could manually select a price and write a description of the item. As an example of system-provided information, the system could automatically determine a sales price and product description (e.g., by searching for product sales and description information for similar items online). If the system automatically generates information, the user may be provided the option to edit the information.

As shown at block 612, information is provided from the virtual closet to the selected online selling platform to place the item for sale on the platform. This may include providing the virtual representation of the item from the virtual closet (i.e., the visual depiction of the item) and the additional information provided at block 610. It may also include account information for the user to allow the online selling platform to identify the user. Based on this information, the online selling platform may place the item for sale on the platform.

When a physical item is sold, the virtual representation of the item may be removed from the virtual closet. Accordingly, an indication that the item has been sold is received at block 614. This may be an indication received from the online selling platform, a manual indication from the user, or input from another source. Based on the indication that the item has been sold, the virtual representation of the item is removed from the virtual closet, as shown at block 616. In some embodiments, the virtual representation may be automatically removed. In other embodiments, the virtual closet may tag the virtual representation as sold and may prompt the user to allow the user to decide whether to remove the virtual representation from the virtual closet. For instance, in some cases, the user may wish to employ the virtual closet to track items sold.

In some embodiments of the present invention, the virtual closet may be configured to automatically identify items to sell. The virtual closet may identify items to sell based on any number of different factors. For instance, the virtual closet may track usage of items and identify an item to sell based on its usage. This could include identifying an item as having low usage or identifying an item that hasn't been used for a certain period of time (e.g., a user-specified or system-specified period of time). As another example, the decision to sell an item may be based on the number of a particular type of item maintained by the virtual closet. For instance, if the user has several items of a certain type, the user may not need all of them so the virtual closet could determine that some of those items could be sold. Still further, the system may be configured to access price information (e.g., available on the web) to estimate the value of items represented by virtual representations in a user's virtual closet. The determination to sell items may then be made based on the value of items reaching particular pricing thresholds. In other words, when the value of an item reaches a particular threshold as estimated by the system based on available information, the system may recommend selling the item. Other factors could be employed to allow the system to automatically identify items to sell based on information available to the virtual closet.

Similar approaches may be employed by the system to identify items to donate or discard and a recommendation provided to the user. For instance, the system could determine the donation value of an item and allow the user to determine whether it is better to donate or sell an item. As another example, the item may be in a condition such that it should be discarded instead of sold. Additionally, some approaches may include first attempting to sell an item and if the item can't be sold, donating or discarding the item. Alternatively, the system may be configured to automatically identify items that should not be sold, donate, or otherwise discarded for various reasons. Such items could be marked as "keep" by the system. Any and all such variations are contemplated to be within the scope of embodiments of the present invention.

Figure 7:
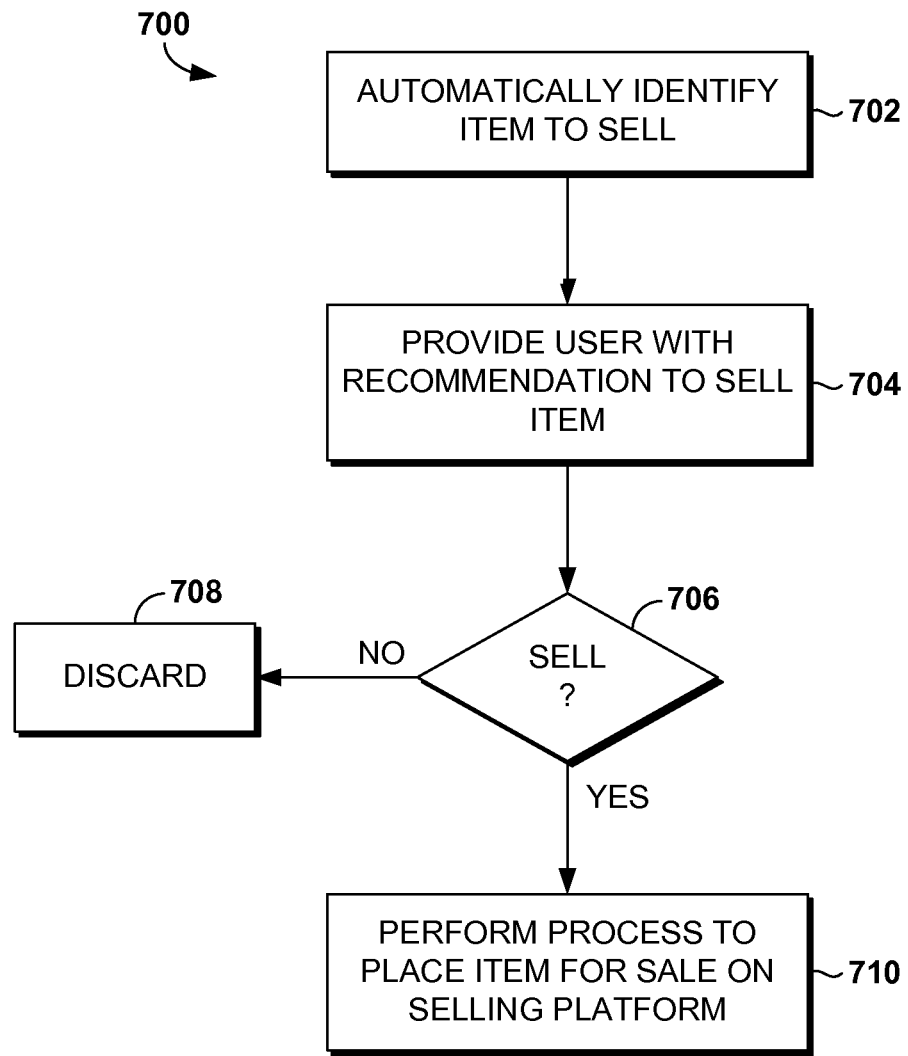
FIG. 7 is a flow diagram showing a method for employing a virtual closet to automatically identify an item to sell and placing the item for sale on an online selling platform in accordance with an embodiment of the present invention.

FIG. 7 illustrates a flow diagram for a method 700 for employing a virtual closet to automatically identify an item to sell and placing the item for sale on an online selling platform in accordance with an embodiment of the present invention. In the embodiment shown in FIG. 7, the system automatically identifies an item to sell; however, the user is given the option to decide whether to actually place the item for sale on an online selling platform. As shown at block 702, the system automatically identifies an item to sell based on information available to the virtual closet. As noted above, this may include, for instance, information regarding the item's usage or the number of items of that type the user owns.

An indication is provided to the user at block 704 to notify the user that an item has been automatically identified and recommended for selling. For instance, a user notification could be presented when the user accesses the virtual closet or may be sent to the user via other mechanisms, such as sending an email to the user or providing the notification via an application on the user's mobile device. As part of this notification, the user is given the option to place the item for sale. Accordingly, a determination is made at block 706 regarding whether the user has selected to place the item for sale. If the user indicates that the item should not be placed for sale, the system discards the recommendation at block 708. In some embodiments, the system may keep a history of recommendations and user responses that may impact future recommendations by the system. For instance, if a user indicates not to sell a particular item recommended by the system, the system may use that information such that it does not recommend selling that item again for at least a certain period of time.

Alternatively, if the user selects to place the item for sale, a process is performed at block 710 to provide information from the virtual closet to an online selling platform to place the item for sale on the selling platform. This process may similar to blocks 606, 608, 610, and 612 of the method 600 described above with reference to FIG. 6. For instance, the process may include selecting an online selling platform, collecting additional information for the item, and providing information from the virtual closet to the online selling platform to place the item for sale.

In further embodiments, the system may be configured to not only automatically identify items to sell but may also automatically provide information for identified items to online selling platforms. The online selling platforms may advertise such items in order to receive offers for the items from potential buyers. The offers may then be provided to the owner who may decide to accept or reject the offers.

Figure 8:
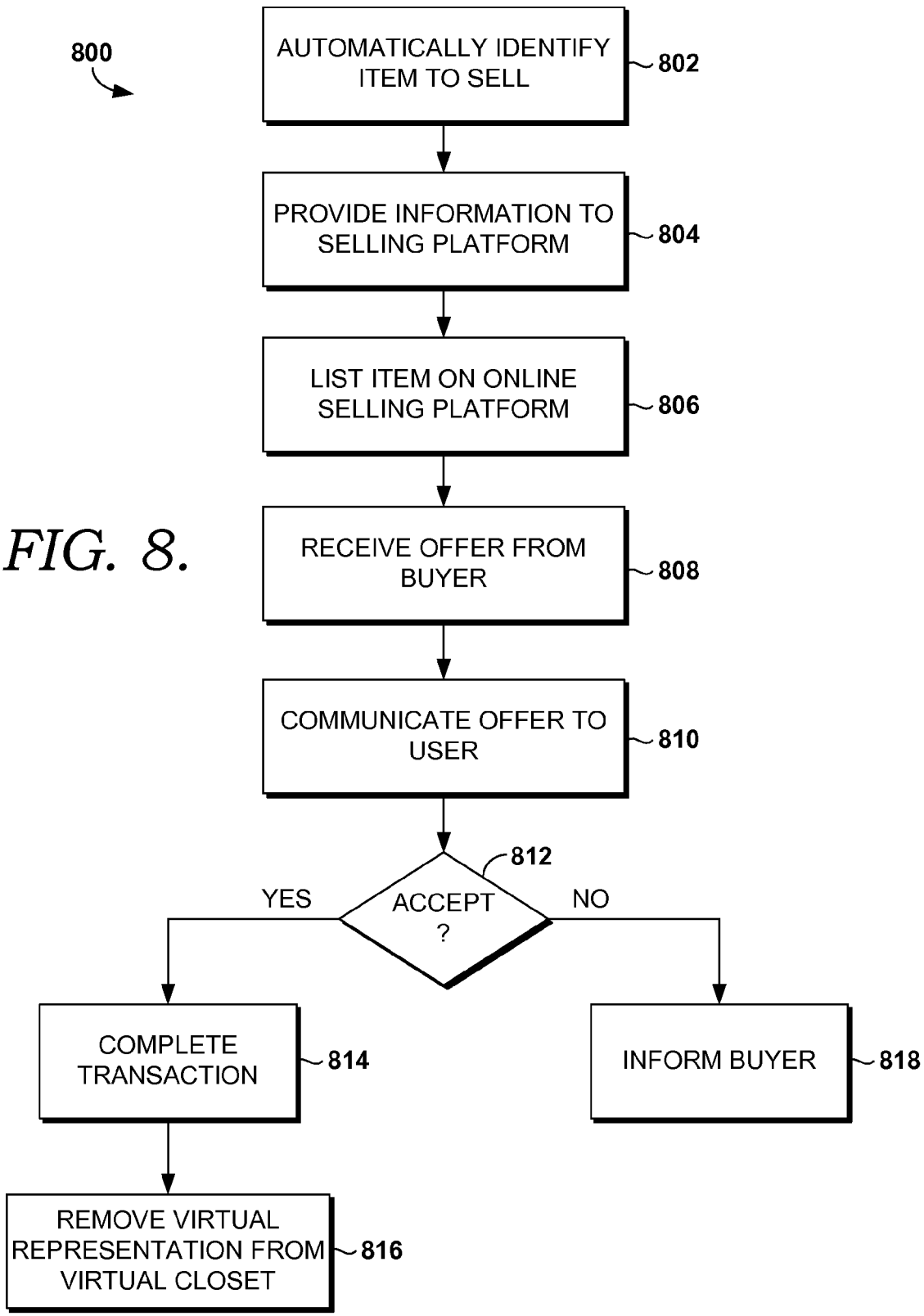
FIG. 8 is a flow diagram showing a method for automatically identifying items to sell from a user's virtual closet and automatically providing information for identified items to an online selling platform in accordance with an embodiment of the present invention.

Turning to FIG. 8, a flow diagram is provided that illustrates a method 800 for automatically identifying items to sell from a user's virtual closet and automatically providing information for identified items to an online selling platform in accordance with an embodiment of the present invention. Initially, as shown at block 802, the system automatically identifies an item to sell based on information available to a user's virtual closet. As previously discussed, the system may identify the item based on a variety of different information, such as information regarding the item's usage or the number of items of a particular type the user owns.

In response to identifying the item, information for the item is automatically provided to an online selling platform, as shown at block 804. This information may include the virtual representation of the item (i.e., the visual depiction) from the user's virtual closet. Other information describing the item may also be provided to the online selling platform to facilitate listing the item.

Based on the received information, the online selling platform lists the item, as shown at block 806. A potential buyer may then view the item on the online selling platform and submit an offer to purchase the item. Accordingly, an offer to purchase the item is received by the online selling platform at block 808. The offer may include offer terms from the buyer, such as a purchase price. The online selling platform communicates the offer to purchase the item to the user's virtual closet or otherwise communicates the offer to the user, and the offer is presented to the user, as shown at block 810. In some embodiments, the system may also retrieve pricing information regarding the price for which similar items have been recently sold and provide the information to the user. The user could review the information to make sure that the buyer is offering a fair price.

The user may view the offer to purchase the item and determine whether to accept or reject the offer. Accordingly, a determination is made at block 812 regarding whether the user accepts or rejects the offer. If the user accepts the offer, an indication is provided to the online selling platform, which may then complete the sale of the item, as shown at block 814. After the item has been sold, an indication that the item has been sold may be provided to the virtual closet, and the virtual representation of the item in the virtual closet may be tagged as sold and/or the virtual representation may be removed from the virtual closet, as shown at block 816.

Alternatively, the user may decide to reject the buyer's offer. If so, an indication is provided to the online selling platform, which may then inform the buyer that the offer has been rejected, as shown at block 818. In some instances, the user may simply not want to sell the item. In other instances, the user may wish to sell the item; however, the user may believe that the buyer's offer price is too low. In such instances, the system may allow the user to enter a counteroffer, which is provided to the online selling platform and communicated to the buyer. This process of counteroffers may continue until an offer is accepted or the seller and/or buyer decide not to complete a transaction for the item.

In embodiments in which the system is configured to automatically identify items to sell based on information available to the virtual closet, the user may be given the option to tag virtual representations of items the user does not wish to sell. Accordingly, the system will not consider any virtual representations that are tagged as such.

In addition to using a virtual closet to place items for sale, a user may leverage the virtual closet in order to purchase items from online selling platforms. In particular, a user could indicate that the user would like to purchase items that are similar to a particular item the user owns or would like to own that is represented with virtual representations in the user's virtual closet. For instance, a user could upload information to an online selling platform regarding a virtual representation of a particular item to place an advertisement to purchase a similar item. As another example, the user may have a collection of items and may leverage the virtual closet to purchase additional items that would help complete the collection.

While above embodiments have been discussed in the context of selling items, similar approaches may be used to allow a user to rent or lease items. In particular, items to rent or lease may be manually or automatically identified. Virtual representations of those items may then be provided from the virtual closet to an online platform or other mechanism to allow others to view the virtual representations and other related information and decide to rent or lease the physical items from the user.

In further embodiments of the present invention, the virtual closet may be leveraged to provide advertising opportunities. Because the virtual closet can be used to store information for any item the user owns, any item the user may wish to purchase, and memorabilia items for the user, the virtual closet provides a large amount of information for targeting advertisements to the user. This is much richer data than, for instance, what a website such as the AMAZON website has available. For instance, the AMAZON website is limited to information regarding what a user has looked at and/or purchased from the AMAZON website. In contrast, the virtual closet provides much more complete and richer information that would be valuable for advertising targeting purposes since it includes information regarding what items the user owns and/or would like to purchase regardless of where the user purchased owned items or purchases new items. Additionally, the virtual closet presents more robust advertising opportunities since it isn't limited to a particular location for purchasing items. In particular, the AMAZON website is limited to recommending purchases through the AMAZON website and affiliated merchants. In contrast, the virtual closet could advertise items that could be purchased anywhere, including both online retailers and "brick and mortar" stores.

Because a large amount of information regarding the user is available from the virtual closet, privacy settings may be provided that allow the user to specify the extent to which the information is available for advertising and other purposes. For instance, the user may allow all of the information from the virtual closet, only certain portions of the virtual closet, or none of the virtual closet to be employed for advertising purposes. Other techniques for anonymizing the data may also be employed within the scope of embodiments of the present invention to address privacy concerns of users.

In some embodiments, the system could provide advertising opportunities based on tracking and usage information available to the virtual closet. In some instances, the tracking and usage information may indicate what items the user often uses. This may provide a better indication of the user's interests. For instance, the user may own both golf clubs and a tennis racket. However, the tracking and usage information may indicate that the user infrequently uses the golf clubs but frequently uses the tennis racket. This information may indicate that the user is more interested in tennis products than golf products. As such, the system may target tennis-related advertisements to the user.

Tracking and usage information from a user's virtual closet could also be employed to identify items the user may need to purchase and to deliver advertisements based on those needs. For instance, the tracking and usage information may indicate that the user is almost out of a certain item or that the expiration date for an item is approach or has past. As such, the system could not only provide a reminder for the user to purchase more of that item, but the system could also serve advertisements associated with that item.

In some embodiments, advertising may be triggered based on the user's retrieval of virtual representations of items from the virtual closet. In particular, when a user retrieves an item from the virtual closet, the system may identify advertising opportunities based on the item corresponding with the retrieved virtual representation. For instance, a user may retrieve a virtual representation of a battery-powered tool from the user's virtual closet so the user could locate the tool in the user's house. Based on this retrieval and other information available to the virtual closet, the system may determine that the tool requires a certain type of battery that the user currently does not have. As such, the system may identify an opportunity to present battery advertisements to the user.

Advertisements may be selected based on the virtual closet alone in some embodiments. In particular, advertisements may be selected solely based on the information available to the virtual closet. In other embodiments, information from the virtual closet may be leveraged when selecting advertisements in other contexts. By way of example only and not limitation, information from a user's virtual closet may be employed in the context of search advertising. In particular, when a user submits a search query, information from both the user's search and the user's virtual closet may be employed to select advertisements that are displayed on the search results page returned to the user in response to the search query. It should be understood that this is only one example and a user's virtual closet may be employed to target advertisements in a variety of other advertising contexts.

Figure 9:
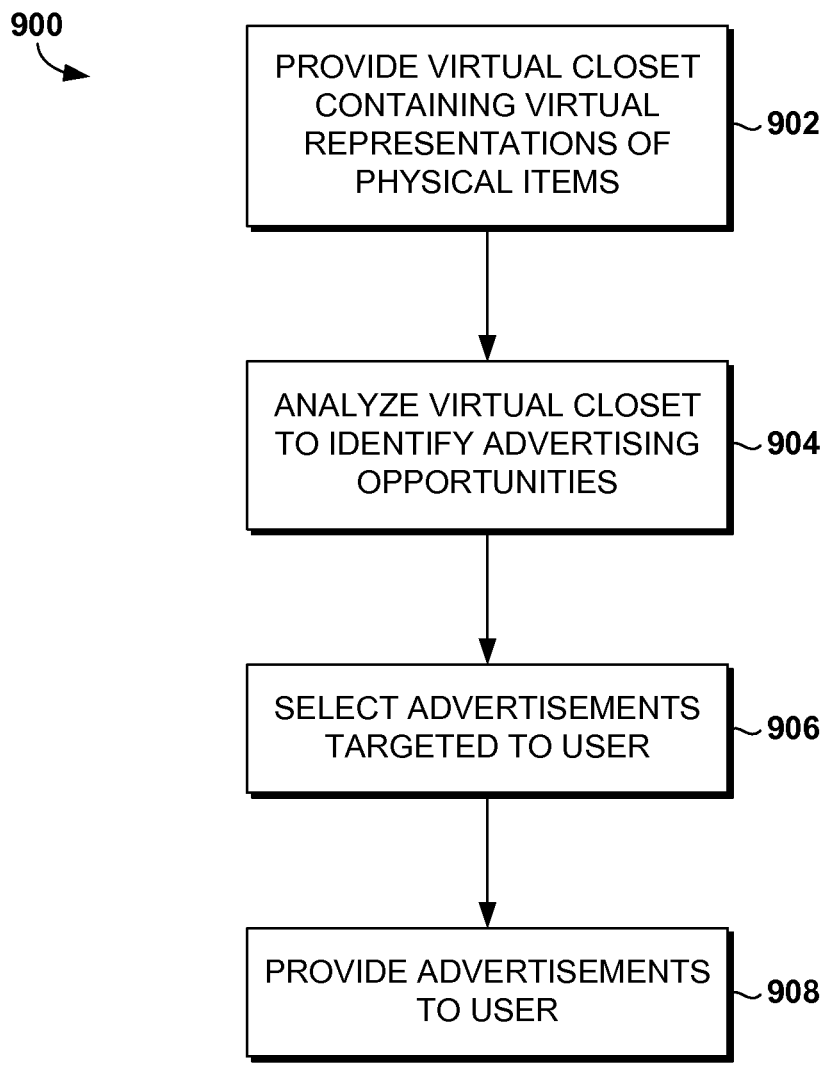
FIG. 9 is a flow diagram showing a method for employing a virtual closet to provide targeted advertisements in accordance with an embodiment of the present invention.

With reference now to FIG. 9, a flow diagram is provided that illustrates a method 900 for employing a virtual closet to provide targeted advertisements in accordance with an embodiment of the present invention. Initially, as shown at block 902, a virtual closet is provided that includes virtual representations of physical items and information associated with those virtual representations. As noted above, in some embodiments, the virtual closet may store information and virtual representations of items the user owns, items the user would like to purchase and/or memorabilia items.

The virtual closet is analyzed at block 904 to identify advertising opportunities, and advertisements targeted to the user based on the virtual closet are selected at block 906. As discussed previously, information from the virtual closet may be used to target advertisements in a number of different manners. For instance, advertisements may be selected based on the items owned by the user, items the user wishes to purchase, tracking and usage information, and virtual representations of items retrieved from the virtual closet.

Selected advertisements are provided to the user, as shown at block 908. This may include presenting the advertisements in the context of the virtual closet or through other mechanisms. For instance, advertisements may be presented when a user accesses the virtual closet and/or as the user navigates through virtual representations of items in the virtual closet. Advertisements could also be provided through other mechanisms, such as emailing advertisements to users, using an application on a user's mobile device to present advertisements, or providing advertisements in other contexts such as search advertising. Any and all such variations are contemplated to be within the scope of embodiments of the present invention.

In accordance with some embodiments of the present invention, a user may control other people's access to his/her virtual closet. In some instances, the user may restrict access to the virtual closet such that only the user can access the virtual closet. In other instances, the user may permit different access levels to others. For instance, the user may provide certain people with access to the entire virtual closet, to defined portions of the virtual closet (e.g., owned items, clothes, etc.), or to individual items within the virtual closet. The access rights could be defined on a per-user basis so different people may have different access rights to the virtual closet. As such, other people may browse/search the user's virtual closet and view virtual representations of items in the user's virtual closet. This may facilitate a number of social features, including commenting on items and sharing items between users. In some embodiments, the virtual closet could facilitate a user allowing others to borrow or rent items by allowing them to view and select the virtual representations of the items from the user's virtual closet A user may also be able to send virtual representations of items from a virtual closet to another person. In some instances, a user could communicate a virtual representation from the user's virtual closet to another user's virtual closet. For instance, a user could send a virtual representation of a dress from her virtual closet to a friend's virtual closet. In other embodiments, virtual representations could be sent from a virtual closet to other people outside of a virtual closet environment. For instance, a user could create a three-dimensional album of virtual representations of memorabilia items from a vacation and post the three-dimensional album via the FACEBOOK website. As another example, a user could email a family member a three-dimensional representation of a gift before the actual gift arrives in the mail.

As can be understood, embodiments of the present invention provide a virtual closet containing virtual representations of items owned by a user, items a user doesn't currently own but wishes to own, and/or memorabilia items. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media, not consisting of a transitory propagating signal per se, storing computer-useable instructions that, when used by one or more computing devices, cause the one or more computing devices to perform a method, the method comprising:
    storing a plurality of virtual representations of physical items in a virtual closet;
    storing metadata for each of the virtual representations to indicate each virtual representation as corresponding with an owned item, a wish list item, or a memorabilia item;
    wherein the plurality of virtual representations include at least one virtual representation identified as corresponding with an owned item, at least one virtual representation identified as corresponding with a wish list item, and at least one virtual representation identified as corresponding with a memorabilia item;
    accessing a digital version of a document for a first physical item owned by the user, the document comprising at least one selected from the following: a user guide for the first physical item, a manual for the first physical item, and instructions for the first physical item; and
    storing the digital version of the document with a virtual representation of the first physical item in the virtual closet.

2. The one or more computer storage media of claim 1, wherein the method further comprises displaying at least a portion of the plurality of virtual representations of physical items with an indication for each virtual representation indicating each virtual representation as corresponding with an owned item, a wish list item, or a memorabilia item.

3. The one or more computer storage media of claim 1, wherein the method further comprises:
    employing an image capturing device to scan a first physical item;
    generating a three-dimensional virtual representation of the first physical item;
    receiving metadata for the three-dimensional virtual representation of the first physical item indicating the first physical item as an owned item, a wish list item, or a memorabilia item; and
    storing the three-dimensional virtual representation of the first physical item and the metadata in the virtual closet.

4. The one or more computer storage media of claim 1, wherein the method further comprises:
    employing an image capturing device to automatically scan a first physical item;
    determining whether a virtual representation of the first physical item is already stored in the virtual closet;
    if a virtual representation of the first physical item is already stored in the virtual closet, discarding scanning information for the first physical item; and
    if a virtual representation of the first physical item is not already stored in the virtual closet, automatically storing a three-dimensional virtual representation of the first physical item in the virtual closet with metadata indicating the first physical item as an owned item, a wish list item, or a memorabilia item.

5. The one or more computer storage media of claim 1, wherein the method further comprises:
    employing an image capturing device to automatically scan a first physical item;

determining whether a virtual representation of the first physical item is already stored in the virtual closet;

if a virtual representation of the first physical item is already stored in the virtual closet, discarding scanning information for the first physical item; and if a virtual representation of the first physical item is not already stored in the virtual closet:
(1) providing a notification to a user requesting user input regarding whether to store a virtual representation of the first physical item in the virtual closet,
(2) receiving a user command to store a virtual representation of the first physical item in the virtual closet, and
(3) storing a three-dimensional virtual representation of the first physical item in the virtual closet with metadata indicating the first physical item as an owned item, a wish list item, or a memorabilia item.

6. The one or more computer storage media of claim 1, wherein the method further comprises storing location information with a virtual representation for a first physical item, the location information indicating a location of the first physical item in the real world.

7. The one or more computer storage media of claim 1, wherein the method further comprises storing usage information with a virtual representation for a first physical item, the usage information indicating usage of the physical item in the real world.

8. The one or more computer storage media of claim 1, wherein the method further comprises:
downloading a virtual representation of a first physical item from a merchant; and
storing the virtual representation of the first physical item in the virtual closet.

9. The one or more computer storage media of claim 1, wherein the method further comprises:
accessing a repository of virtual representations of physical items;
receiving a user selection of a virtual representation of a first physical item from the repository;
downloading the virtual representation of a first physical item from the repository; and
storing the virtual representation of the first physical item in the virtual closet.

10. A method comprising:
storing, by one or more processors, a plurality of virtual representations of physical items in a virtual closet;
storing, by the one or more processors, metadata for each of the virtual representations to indicate each virtual representation as corresponding with an owned item, a wish list item, or a memorabilia item;
wherein the plurality of virtual representations include at least one virtual representation identified as corresponding with an owned item, at least one virtual representation identified as corresponding with a wish list item, and at least one virtual representation identified as corresponding with a memorabilia item;
accessing, by the one or more processors, a digital version of a document for a first physical item owned by the user, the document comprising at least one selected from the following: a user guide for the first physical item, a manual for the first physical item, and instructions for the first physical item; and
storing, by the one or more processors, the digital version of the document with a virtual representation of the first physical item in the virtual closet.

11. The method of claim 10, wherein the method further comprises displaying at least a portion of the plurality of virtual representations of physical items with an indication for each virtual representation indicating each virtual representation as corresponding with an owned item, a wish list item, or a memorabilia item.

12. The method of claim 10, wherein the method further comprises:
employing an image capturing device to scan a first physical item;
generating a three-dimensional virtual representation of the first physical item;
receiving metadata for the three-dimensional virtual representation of the first physical item indicating the first physical item as an owned item, a wish list item, or a memorabilia item; and
storing the three-dimensional virtual representation of the first physical item and the metadata in the virtual closet.

13. The method of claim 10, wherein the method further comprises:
employing an image capturing device to automatically scan a first physical item;
determining whether a virtual representation of the first physical item is already stored in the virtual closet;
if a virtual representation of the first physical item is already stored in the virtual closet, discarding scanning information for the first physical item; and
if a virtual representation of the first physical item is not already stored in the virtual closet, automatically storing a three-dimensional virtual representation of the first physical item in the virtual closet with metadata indicating the first physical item as an owned item, a wish list item, or a memorabilia item.

14. The method of claim 10, wherein the method further comprises:
employing an image capturing device to automatically scan a first physical item;
determining whether a virtual representation of the first physical item is already stored in the virtual closet;
if a virtual representation of the first physical item is already stored in the virtual closet, discarding scanning information for the first physical item; and
if a virtual representation of the first physical item is not already stored in the virtual closet:
(1) providing a notification to a user requesting user input regarding whether to store a virtual representation of the first physical item in the virtual closet,
(2) receiving a user command to store a virtual representation of the first physical item in the virtual closet, and
(3) storing a three-dimensional virtual representation of the first physical item in the virtual closet with metadata indicating the first physical item as an owned item, a wish list item, or a memorabilia item.

15. The method of claim 10, wherein the method further comprises storing location information with a virtual representation for a first physical item, the location information indicating a location of the first physical item in the real world.

16. The method of claim 10, wherein the method further comprises storing usage information with a virtual representation for a first physical item, the usage information indicating usage of the first physical item in the real world.

17. The method of claim 10, wherein the method further comprises:
downloading a virtual representation of a first physical item from a merchant; and
storing the virtual representation of the first physical item in the virtual closet.

18. The method of claim 10, wherein the method further comprises:
    accessing a repository of virtual representations of physical items;
    receiving a user selection of a virtual representation of a first physical item from the repository;
    downloading the virtual representation of a first physical item from the repository; and
    storing the virtual representation of the first physical item in the virtual closet.

19. A computerized system comprising:
    one or more processors; and
    one or more computer storage media storing computer-useable instructions that, when used by the one or more processors, cause the one or more processors to:
        store a plurality of virtual representations of physical items in a virtual closet;
        store metadata for each of the virtual representations to indicate each virtual representation as corresponding with an owned item, a wish list item, or a memorabilia item;
        wherein the plurality of virtual representations include at least one virtual representation identified as corresponding with an owned item, at least one virtual representation identified as corresponding with a wish list item, and at least one virtual representation identified as corresponding with a memorabilia item;
        access a digital version of a document for a first physical item owned by the user, the document comprising at least one selected from the following: a user guide for the first physical item, a manual for the first physical item, and instructions for the first physical item; and
        store the digital version of the document with a virtual representation of the first physical item in the virtual closet.

* * * * *